April 29, 1952 C. H. YOUNG 2,594,530
AMPLIFYING SYSTEM
Filed Oct. 2, 1948
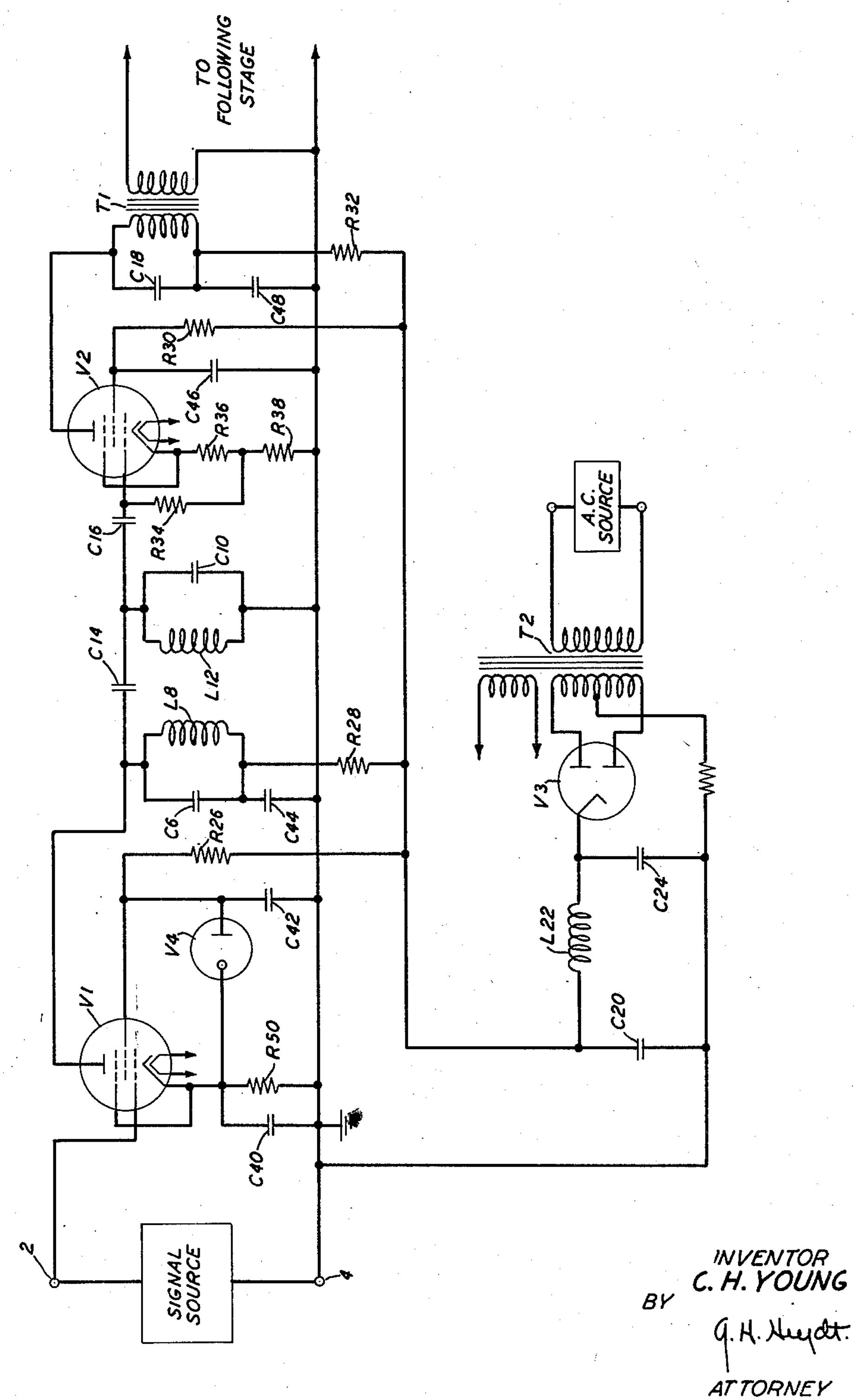
INVENTOR
C. H. YOUNG
BY
G. H. Heydt.
ATTORNEY Patented Apr. 29, 1952

2,594,530

UNITED STATES PATENT OFFICE 2,594,530

AMPLIFYING SYSTEM

Clarence H. Young, Lincoln Park, N. J., assignor to Bell Telephone Laboratories, Incorporated, New York, N. Y., a corporation of New York Application October 2, 1948, Serial No. 52,579

11 Claims. (Cl. 179—171)

This invention relates to amplifying systems and more particularly to amplifying systems wherein the sensitivity change due to supply voltage variation is compensated.

The change in gain or sensitivity of an amplifier, when caused by a variation in the supply voltage, may be prevented by the employment of a voltage regulator in the primary supply source. However, there are applications where the use of a voltage regulator in the primary supply source may not be feasible.

In accordance with the present invention the principal objective of maintaining the sensitivity of an amplifier as constant as possible with varying primary current in the system is achieved by directly associating a voltage regulating or controlling device with the space discharge device of the input stage of the amplifier to vary the gain of the input stage and the input sensitivity of the amplifier, and thereby compensate the amplifier sensitivity change due to supply voltage variation.

The nature of the invention and its distinguishing features and advantages will be more clearly understood from the following detailed description and the accompanying drawings in which:

Fig. 1 illustrates schematically an embodiment of the invention comprising the input and second stages of a multistage amplifier.

Referring more particularly to Fig. 1, the control grid of amplifier V1 receives a signal wave from the signal source coupled to input terminals 2 and 4. The anode of amplifier V1 is coupled to the control grid of amplifier V2 by means of the band-pass filter network comprising the components C6, L8, C10, L12 and C14, and condenser C16. The second stage amplifier V2 operates into transformer T1, the primary of which is shunted by condenser C18. Direct-current power for the amplifier may be obtained in the conventional manner from an alternating-current source, through transformer T2, rectifier V3 and the smoothing filter comprising the components C20, L22 and C24. Screen grid and plate potentials are provided for amplifier V1 through the resistors R26 and R28, respectively, and for amplifier V2 through the resistors R30 and R32, respectively. Resistors R34, R36 and R38 are grid and cathode bias resistors, respectively; the components C40, C42 and C46 are by-pass condensers; and the components C44 and C48 are employed as conventional blocking condensers. Electron discharge device V4 is connected from the cathode side of the cathode resistor R50 to the positive side of the potential source and to the screen grid of amplifier V1 thereby stabilizing the cathode to screen potential. By way of example for the specific embodiment of the invention shown in Fig. 1 the electron discharge device V4 may be of any suitable type such as the conventional No. 991 voltage regulator tube.

As the direct current supply voltage for the amplifying system decreases, the current through the regulating device V4 will decrease at a greater rate than the supply voltage thereby decreasing the voltage drop in the cathode resistor R50 and increasing the gain of amplifier V1. Also, as the direct current supply voltage for the amplifying system increases, the current through the regulating device V4 will increase at a greater rate than the supply voltage thereby increasing the voltage drop in the cathode resistor R50 and decreasing the gain of amplifier V1. It will be seen that the structural arrangement comprising the regulating device V4 will stabilize the screen grid electrode potential and change the control grid-cathode bias of amplifier V1 simultaneously with the supply voltage variation. Amplifier sensitivity change due to supply voltage variation is thereby effectively compensated.

Although the amplifying system shown in the specific embodiment of the invention illustrated in Fig. 1 comprises space discharge devices which include screen grids, effective sensitivity compensation is also provided by this invention in amplifying systems comprising space discharge devices which do not include screen grids. The circuit arrangement for such systems is similar to that shown in Fig. 1 with the exception that the screen grids and the screen grid connections to the potential source and to the voltage regulating device are eliminated.

While modifications in the structures shown may occur to those skilled in the art, the invention is intended to be limited only by the scope of the following claims.

What is claimed is:

1. In a multistage amplifier, an input stage including a space discharge device comprising an anode and a cathode, a resistor connected to said cathode, a second stage including a space discharge device comprising a control grid, a voltage regulating electron discharge device, and a potential source, wherein said anode is connected to the positive side of said potential source and to said control grid, the cathode side of said resistor is connected through said voltage regulating electron discharge device to the positive side of said potential source, and the other side of said resistor is connected to the negative side of said potential source.

2. In a multistage amplifier, an input stage including a space discharge device comprising an anode and a cathode, a resistor connected to said cathode, a second stage including a space discharge device comprising a control grid, a two-terminal voltage regulating device, and a potential source, wherein said anode is connected to the positive side of said potential source and to said control grid, one terminal of said voltage regulating device is connected to the cathode side of said resistor and the other terminal of said voltage regulating device is connected to the positive side of said potential source, and the other side of said resistor is connected to the negative side of said potential source.

3. In a multistage amplifier, an input stage including a space discharge device comprising an anode and a cathode, a resistor connected to said cathode, a second stage including a space discharge device comprising a control grid, a potential source, and a voltage regulating device comprising two electrodes, wherein said anode is connected to the positive side of said potential source and to said control grid, one of said electrodes is connected to the cathode side of said resistor and the other of said electrodes is connected to the positive side of said potential source, and the other side of said resistor is connected to the negative side of said potential source.

4. An amplifier stage including a space discharge device comprising an anode and a cathode, a resistor connected to said cathode, a condenser connected in shunt to said resistor, a voltage regulating electron discharge device, and a potential source, wherein said anode is connected to the positive side of said potential source, the cathode side of said resistor is connected through said voltage regulating electron discharge device to the positive side of said potential source, and the other side of said resistor is connected to the negative side of said potential source.

5. An amplifier stage including a space discharge device comprising an anode and a cathode, a resistor connected to said cathode, a condenser connected in shunt to said resistor, a potential source, and a voltage regulating device comprising two electrodes, wherein said anode is connected to the positive side of said potential source, one of said electrodes is connected to the cathode side of said resistor and the other of said electrodes is connected to the positive side of said potential source, and the other side of said resistor is connected to the negative side of said potential source.

6. In a multistage amplifier, an input stage including a space discharge device comprising an anode, a cathode, and a screen grid electrode, a resistor connected to said cathode, a second stage including a space discharge device comprising a control grid, a voltage regulating electron discharge device, and a potential source, wherein said anode is connected to the positive side of said potential source and to said control grid, the cathode side of said resistor is connected through said voltage regulating electron discharge device to said screen grid electrode and to the positive side of said potential source, and the other side of said resistor is connected to the negative side of said potential source.

7. In a multistage amplifier, an input stage including a space discharge device comprising an anode, a cathode, and a screen grid electrode, a resistor connected to said cathode, a second stage including a space discharge device comprising a control grid, a two-terminal voltage regulating device, and a potential source, wherein said anode is connected to the positive side of said potential source and to said control grid, one terminal of said voltage regulating device is connected to the cathode side of said resistor, the other terminal of said voltage regulating device is connected to said screen grid electrode and to the positive side of said potential source, and the other side of said resistor is connected to the negative side of said potential source.

8. In a multistage amplifier, an input stage including a space discharge device comprising an anode, a cathode, and a screen grid electrode, a resistor connected to said cathode, a second stage including a space discharge device comprising a control grid, a potential source, and a voltage regulating device comprising two electrodes, wherein said anode is connected to the positive side of said potential source and to said control grid, one electrode of said voltage regulating device is connected to the cathode side of said resistor, the other electrode of said voltage regulating device is connected to said screen grid electrode and to the positive side of said potential source, and the other side of said resistor is connected to the negative side of said potential source.

9. An amplifier stage including a space discharge device comprising an anode, a cathode, and a screen grid electrode, a resistor connected to said cathode, a condenser connected in shunt to said resistor, a voltage regulating electron discharge device, and a potential source, wherein said anode is connected to the positive side of said potential source, the cathode side of said resistor is connected through said voltage regulating electron discharge device to said screen grid electrode and to the positive side of said potential source, and the other side of said resistor is connected to the negative side of said potential source.

10. An amplifier stage including a space discharge device comprising an anode, a cathode, and a screen grid electrode, a resistor connected to said cathode, a condenser connected in shunt to said resistor, a two-terminal voltage regulating device, and a potential source, wherein said anode is connected to the positive side of said potential source, one terminal of said voltage regulating device is connected to the cathode side of said resistor, the other terminal of said voltage regulating device is connected to said screen grid electrode and to the positive side of said potential source, and the other side of said resistor is connected to the negative side of said potential source.

11. An amplifier stage including a space discharge device comprising an anode, a cathode, and a screen grid electrode, a resistor connected to said cathode, a condenser connected in shunt to said resistor, a potential source, and a voltage regulating device comprising two electrodes, wherein said anode is connected to the positive side of said potential source, one electrode of said voltage regulating device is connected to the cathode side of said resistor, the other electrode of said voltage regulating device is connected to said screen grid electrode and to the positive side of said potential source, and the other side of said resistor is connected to the negative side of said potential source.

CLARENCE H. YOUNG.

REFERENCES CITED

The following references are of record in the file of this patent:

UNITED STATES PATENTS

| Number | Name | Date |
|---|---|---|
| 1,959,010 | Tellegen | May 15, 1934 |
| 2,178,985 | Blumlein | Nov. 7, 1939 |
| 2,411,440 | Le Page | Nov. 19, 1946 |
| 2,449,685 | Bouman | Sept. 21, 1948 |